United States Patent [19]

Connolly

[11] Patent Number: 5,409,725
[45] Date of Patent: Apr. 25, 1995

[54] METHODS FOR STABILIZING PROTEINS IN AN ACID PH ENVIRONMENT AND RELATED COMPOSITIONS

[75] Inventor: Philip Connolly, 469 E. Julliard Drive, Claremont, Calif. 91711

[73] Assignees: Philip Connolly; Vitex Foods, Inc., both of Los Angeles, Calif.

[21] Appl. No.: 902,234

[22] Filed: Jun. 23, 1992

[51] Int. Cl.$^6$ .............................................. A23L 2/02
[52] U.S. Cl. .............................. 426/599; 426/330.2; 426/330.3; 426/330.5; 426/520; 426/573; 426/577; 426/580; 426/590; 426/616; 426/654; 426/656; 426/657

[58] Field of Search ............... 426/590, 599, 654, 656, 426/657, 616, 573, 577, 330.2, 330.3, 330.5, 520, 580, 588

[56] References Cited

U.S. PATENT DOCUMENTS

| | | | |
|---|---|---|---|
| 2,859,115 | 11/1958 | Rivoche | 426/580 |
| 3,862,342 | 1/1975 | Maraulja et al. | 426/639 |
| 4,046,925 | 9/1977 | Igoe . | |
| 4,200,661 | 4/1980 | Brigand et al. | 426/573 |
| 4,212,893 | 7/1980 | Takahata | 426/330.2 |
| 4,244,981 | 1/1981 | Blake . | |
| 4,374,287 | 2/1983 | Imai et al. . | |
| 4,530,850 | 7/1985 | Trop . | |
| 4,559,233 | 12/1985 | Chen et al. . | |
| 4,563,360 | 1/1986 | Soucie et al. . | |
| 4,575,551 | 3/1986 | Fujiyama et al. . | |
| 4,762,726 | 8/1988 | Soucie et al. . | |
| 4,828,866 | 5/1989 | Wade et al. . | |
| 4,830,868 | 5/1989 | Wade et al. . | |
| 4,885,179 | 12/1989 | Soucie et al. . | |
| 5,063,073 | 11/1991 | Kratochvil . | |

Primary Examiner—Helen Pratt
Attorney, Agent, or Firm—Pretty, Schroeder Brueggemann & Clark; Wendy A. Whiteford

[57] ABSTRACT

Processes for stabilizing protein in acid pH media are provided as well as the compositions produced thereby. Acidified protein compositions exhibiting protein stability for extended periods of time are also provided. The processes of the present invention promote chemical reaction between protein and galactomannan to achieve protein stability in acid pH media.

23 Claims, No Drawings

METHODS FOR STABILIZING PROTEINS IN AN ACID PH ENVIRONMENT AND RELATED COMPOSITIONS

BACKGROUND OF THE INVENTION

The present invention relates to methods of stabilizing proteins in acidic pH environments and related compositions. In a particular embodiment of the present invention, long term protein stability in acidic pH environments is achieved by promoting chemical reaction between proteins and galactomannan.

The health conscious public is hungry for nutritional foods and beverages that have the refreshing flavors of fruit juice and high protein content, preferably with little or no fat. At the same time the public has little tolerance for curds which inherently form when unmodified forms of protein are introduced directly into an acidic medium, for example, when milk is mixed with orange juice. Although the result is not harmful, it is unappealing. Consequently, the food and beverage industries have searched for methods of stabilizing proteins in acid environments in order to prevent proteins from curdling and precipitating out of acidic beverages.

To date, the food and beverage industries have met with limited success in this endeavor. Through the use of gums and other stabilizers, methods have been developed to suspend proteins in acidic media. However, the association between stabilizers and proteins in such suspensions is merely mechanical in nature. Consequently, the proteins precipitate out of the acidic medium over relatively short periods of time when subjected to conventional storage conditions for such compositions. Moreover, these suspensions exhibit this temporary stability only within a narrow acid pH range.

Accordingly, a need exists for methods of producing acidified-protein compositions that exhibit long-term stability. The processes and compositions of the present invention meet these needs and provide related advantages as well.

BRIEF DESCRIPTION OF THE INVENTION

Processes for stabilizing protein in acid pH media are provided as well as the compositions produced thereby. Also provided are acidified protein-containing compositions wherein the protein resists curdling in acid pH media for extended periods of time. The processes of the present invention promote chemical reaction between protein and galactomannan to achieve protein resistant to curdling in acid pH media.

DETAILED DESCRIPTION OF THE INVENTION

The present invention relates to methods of stabilizing proteins in acidic pH environments and related compositions. In a particular embodiment of the present invention, long term protein stability in acidic pH environments is achieved by promoting chemical reaction between proteins and galactomannan.

The food and beverage industries have long searched for methods of producing smooth and creamy food and beverages that have the refreshing flavor of fruit juice and high protein content, such as that provided by milk. However, the obvious solution of combining fruit juice with a protein source, such as milk, produces an inherent, undesirable result. Fruit juice tends to have a relatively high acid content and is an inhospitable host for protein. The acidity of the fruit juice causes the protein to curdle and precipitate out of solution. Conventional methods of overcoming the problem of curd formation involve the use of stabilizers that suspend protein in the acid medium. Because the association between the protein and the stabilizer is merely mechanical in nature, however, the stable shelf-life of any product produced by these methods is limited. Typically within hours, the protein curdles. By comparison, the products of the present inventive process maintain protein stability for extended periods of time over a broad acid pH range.

The processes of the present invention promote chemical reaction between protein and galactomannan resulting in products that exhibit stability in acid media, i.e., media having a pH in the range of pH 2 to pH 6. Unlike products produced by conventional methods which exhibit protein stability for, at best, an hour or two, products produced in accordance with the present invention exhibit protein stability for extended periods of time under typical storage conditions.

In accordance with one embodiment of the present invention, there are provided methods of stabilizing protein in an acid pH medium by subjecting an aqueous suspension comprised of protein and galactomannan to conditions sufficient to promote chemical reaction between the protein and the galactomannan, thereby forming an aqueous glycoprotein. The term "glycoprotein" as used herein refers to substances that result from chemical reaction between protein and galactomannan. The aqueous glycoprotein is then combined with a sufficient amount of acidifying agent to reduce the pH of the combination to an acid pH. By acid pH it is meant a pH in the approximate range of pH 2 to 6, and preferably in the approximate range of pH 2 to 5. The process results in a protein stabilized in an acid pH medium.

The process of the present invention has broad application and may be useful in a variety of practical endeavors. Thus the particular proteins, galactomannans, and acidifying agents used in the present invention will be dependent upon the intended use for the acidified protein composition. If the intended use, for example, is an assay to be carried out in an acidic medium, the proteins, galactomannans and acidifying agents employed will be selected so as to be compatible with the assay.

Likewise, if the intended use is to incorporate proteins into an acidic environment to produce an edible product, the proteins, galactomannans and acidifying agents selected for use will be edible. For example, the protein may be animal or vegetable protein including milk protein, soy protein, egg albumen, wheat protein, and the like. Any of the above sources of protein may be used in a variety of processed forms. For example, milk protein may be used in any one or more of the following forms: raw milk, skim milk, ultrafiltered skim milk, whey, caseins, caseinates, and the like. No pretreatment of the protein material used is necessary prior to use in the invention process.

By "galactomannan" it is meant any substantially linear polysaccharide bearing protein-reactive substituents. A presently preferred galactomannan has a substantially linear backbone predominantly comprised of galactose that bears mannose substituents wherein the mannose substituents are distributed along the backbone so as to accommodate ready interaction between protein and galactomannan. Galactomannans useful in the process of the present invention include, for example, locust bean gum and guar gum used alone or in combination with one another.

The range of protein to galactomannan ratios suitable for use in the aqueous suspension of the present invention can vary widely. Typically the range is approximately 5:1 to 20:1. Generally, a more viscous, acid stabilized product results when ratios in the lower end of the range are used, and vice versa. For ease in production, protein and galactomannan may be suspended in water at ambient temperature (i.e., no heating is required) to produce the aqueous suspension.

There are a variety of conditions sufficient to promote chemical reaction between protein and galactomannan. The specific conditions employed will depend upon the nature of the protein and galactomannan used in the process, the ratios of protein and galactomannan used, and the like. For example, generally less energy is required to promote chemical reaction between protein and guar gum than is required to promote chemical reaction between protein and locust bean gum.

Useful conditions sufficient to promote chemical reaction between protein and galactomannan at atmospheric pressure include, for example, subjecting the aqueous suspension comprised of protein and galactomannan to a temperature in the range of approximately 45° C. to 87° C. for a time in the range of approximately 5 minutes to 90 minutes. Generally speaking, if higher temperatures are used, less time will be necessary, and vice versa. Particularly useful conditions sufficient to promote chemical reaction between milk protein and locust bean gum at atmospheric pressure comprise subjecting the aqueous suspension to a temperature in the range of approximately 65° C. to 80° C. for a time in the range of approximately 10 to 45 minutes.

Although the examples above employ heat as an energy source as part or all of the conditions sufficient to promote chemical reaction between protein and galactomannan, other or additional energy sources may be used either alone or in combination with one another, including mechanical energy, microwave energy, and the like.

The term "acidifying agent" as used herein refers to any substance compatible with the desired end product that is capable of lowering the pH of a protein-containing solution. Acidifying agents may be used alone or in combination with one another. Acidifying agents useful in the practice of the present invention include, for example, fruit juices and both organic and inorganic acids. Fruit juices suitable for use in the practice of the present invention include, for example, grape, raspberry, pear, apple, pineapple, elderberry, orange, and the like. Organic acids suitable for use in the practice of the present invention include, for example, citric acid, malic acid, tartaric acid, succinic acid, lactic acid, gluconic acid, ascorbic acid, and the like. Presently preferred organic acids include citric acid and malic acid. Inorganic acids suitable for use in the practice of the present invention include, for example, phosphoric acid, carbonic acid, hydrochloric acid, sulfuric acid, and the like.

Sugar content of acidifying agents is not critical to the processes of the present invention and may be adjusted as desired for flavor or otherwise. One of skill in the art will recognize that sugar content can be measured in a variety of ways, for example, sugar content is measured in the beverage industry as Brix units.

A sufficient amount of acidifying agent is combined with the aqueous glycoprotein to reduce the pH of the combination to an acid. pH, i.e., a pH in the range of pH 2 to pH 6. The amount of acidifying agent necessary to accomplish this result will depend upon factors such as the pH of the aqueous solution of glycoprotein, the pH of the acidifying agent, the concentration of the acidifying agent, the quantity of aqueous solution of glycoprotein to be combined with acidifying agent and the like. Without being bound by any particular theory, it is presently believed that reduction of the pH of the aqueous solution of glycoprotein inhibits further chemical reaction between the protein and galactomannan.

Adjuvants that enhance chemical reaction between protein and galactomannan are preferably added to the aqueous suspension. Adjuvants useful in the process of the present invention include, for example, calcium sequestering agents such as alkali metal salts of tripolyphosphate, disodium phosphate, trisodium citrate, EDTA, trisodium phosphate, sodium hexametaphosphate, and the like.

Heat stabilizing agents may optionally be added to the aqueous suspension. Heat stabilizing agents useful in the process of the present invention include, for example, pectins and especially high methoxyl pectin.

Nutrients including, for example, vitamins, minerals and fiber may optionally be added to the stabilized protein.

In another embodiment of the present invention there are provided products produced in accordance with the above-described processes of the present invention.

In yet another embodiment of the present invention, there is provided a method of manufacturing a stable, protein-fortified juice beverage, by heating a protein-containing aqueous dispersion to a temperature in the range of 71° C. to 77° C. for about 15 minutes to form an aqueous glycoprotein. A presently preferred protein-containing aqueous dispersion is comprised of approximately 1 part protein pre-mix and approximately 15.1 parts water. The protein pre-mix is comprised of approximately 68.5% ultrafiltered skim milk-75% protein, 4.4% alkaline metal salt of tripolyphosphate, 9.1% locust bean gum, and 18.0% high methoxyl pectin and is blended with sufficient aqueous medium to form a 6.21% (w/w) aqueous dispersion. The aqueous glycoprotein is then combined with 60 Brix fruit juice concentrate in a ratio of about 32.2 parts juice concentrate to 100 parts aqueous glycoprotein to form a stable, protein-fortified juice beverage. Optionally, such additives as colors, flavors, vitamins, minerals and fiber may be added to the stable, protein-fortified juice beverage.

Stable, protein-fortified juice beverages produced in accordance with the present invention may be homogenized and sterilized by methods in common use in the beverage industry. For example, to homogenize the beverage, it may be heated to approximately 90° C. and then fed through an APV Gaulin Homogenizer, Model No. MS45TBS (APV Gaulin Homogenizer Inc., Schenectady, N.Y.) at 2500 p.s.i. To sterilize the beverage, for example, it may be heated to at least 89° C. for at least five minutes.

In still another embodiment of the present invention, there are provided products produced in accordance with the above-described processes of the present invention.

In yet another embodiment of the present invention there is provided a protein-containing composition stable in acidic medium comprising glycoprotein and acidifying agent, wherein the composition is characterized by the absence of curd formation for at least about seven days when stored at ambient temperatures in a sterile environment. Preferred compositions are characterized by the absence of curd formation for at least about 30 days when stored at ambient temperatures in a sterile environment. Highly preferred compositions are characterized by the absence of and formation for at least about 60 days.

The invention will now be described in greater detail by reference to the following, non-limiting example.

EXAMPLE

Stable, Protein-Fortified Juice Beverage

The following ingredients were used in the following proportions:

| Protein Pre-Mix | 4.9% |
|---|---|
| Water | 73.88% |
| Fruit Juice | 19.63% |
| Additives | 1.59% |

The protein pre-mix was made by blending the following dry ingredients in the specified proportions:

| Ultrafiltered skim milk-75% protein | 68.5% |
|---|---|
| Sodium/potassium tripolyphosphate | 4.4% |
| Locust bean gum | 9.1% |
| High methoxyl pectin | 18.0% |

The protein pre-mix was then blended with water in the ratio of 1 part protein pre-mix to 15.1 parts cold or ambient temperature water (w/w) using high shear agitation producing a 6.21% (w/w) aqueous dispersion of the dry blend.

The aqueous dispersion was then heated to a temperature in the range of 160° F. to 170° F. (71° C. to 77° C.) for about 15 minutes.

After heating, 60 Brix fruit juice concentrate was added to the aqueous dispersion in the ratio of 32.2:100 (juice: aqueous dispersion) and blended until the mixture was homogenous, producing a stable, protein-fortified juice beverage.

When optionally employed, additives were blended into the stable, protein-fortified juice beverage. The additives included the following:

| Color | 0.05% |
|---|---|
| Citric Acid | 0.08% |
| Malic Acid | 0.28% |
| Maltodextrin | 0.02% |
| Gum Acacia | 0.63% |
| Vitamin and Mineral Pre-mix No. FT102591 (Fortitech, Inc., Schenectady, New York) | 0.14% |
| Flavors | 0.24% |
| Fiber/Mineral Pre-mix: | 0.15% |
| Potassium Citrate | 47.11% |
| Maltodextrin | 14.23% |
| Cellulose Fiber | 0.04% |
| Oat Fiber | 0.04% |
| Guar Gum | 0.04% |
| Xanthan Gum | 0.04% |
| Rice Fiber | 0.04% |
| Gum Acacia | 38.46% |

The beverage was heated to 195° F. (90° C.) and then fed through a APV Gaulin Homogenizer, Model #MS45TBS 75 Horsepower (APV Gaulin, Inc., Wilmington, Mass.) at 2500 p.s.i. The beverage was then sterilized by heating to at least 89° C. for approximately five minutes.

The resulting beverage exhibited no signs of curd formation for at least 90 days when stored at ambient temperature.

Although the invention has been described with reference to the presently-preferred embodiments, it should be understood that various modifications can be made without departing from the spirit of the invention.

I claim:

1. A method of stabilizing protein in an acid pH medium, comprising:
   (a) subjecting an aqueous suspension comprised of protein and galactomannan to conditions sufficient to promote chemical reaction between the protein and the galactomannan to form an aqueous glycoprotein;
   (b) combining the aqueous glycoprotein with a sufficient quantity of an acidifying agent to reduce the pH of the combination to an acid pH.

2. A method in accordance with claim 1, wherein conditions sufficient to promote chemical reaction between the protein and the galactomannan comprise subjecting the suspension to a temperature in the range of about 45° C. to 87° C. for a time in the range of about 5 minutes to 90 minutes.

3. A method in accordance with claim 1, wherein the protein and the galactomannan exist in aqueous suspension in a ratio in the range of about 5:1 to 20:1.

4. A method in accordance with claim 3, wherein the protein and the galactomannan exist in aqueous suspension in a ratio in the range of about 5:1 to about 10:1.

5. A method in accordance with claim 3, wherein said protein is ultrafiltered skim milk.

6. A method in accordance with claim 5, wherein the galactomannan is locust bean gum.

7. A method in accordance with claim 6, wherein conditions sufficient to promote chemical reaction comprise subjecting the suspension to temperature in the range of 65° C. to 78° C. for 10 to 45 minutes.

8. A method in accordance with claim 6, wherein said suspension further comprises an adjuvant that enhances the rate of chemical reaction between protein and galactomannan.

9. A method in accordance with claim 8, wherein conditions sufficient to promote chemical reaction comprise subjecting the suspension to temperature in the range of 65° C. to 78° C. for 10 to 22 minutes.

10. A method in accordance with claim 8, wherein said suspension further comprises pectin.

11. A method in accordance with claim 10, wherein said pectin comprises a high methoxyl pectin.

12. A method in accordance with claim 8, wherein said adjuvant is a calcium sequestering agent.

13. A method in accordance with claim 12, wherein said calcium sequestering agent is disodium phosphate, trisodium citrate, EDTA, trisodium phosphate, sodium hexametaphosphate or an alkali metal salt of tripolyphosphate.

14. A method in accordance with claim 13, wherein said calcium sequestering agent is an alkali metal salt of tripolyphosphate.

15. A method in accordance with claim 14, wherein said calcium sequestering agent is sodium tripolyphosphate.

16. A method in accordance with claim 14, wherein said calcium sequestering agent is potassium tripolyphosphate.

17. A method in accordance with claim 1, wherein said acidifying agent is fruit juice.

18. A method in accordance with claim 1, further comprising adding nutrients to said glycoprotein.

19. An acid-stable protein in an acidic medium produced in accordance with the method of claim 1.

20. A method of manufacturing a stable, protein-fortified juice beverage, comprising:
(a) subjecting protein-containing aqueous dispersion to a temperature in the range of 71° to 77° C. for about 15 minutes to form an aqueous glycoprotein; wherein said aqueous dispersion comprises 68.5% ultrafiltered skim milk-75% protein, 4.4% alkali metal salt of tripolyphosphate, 9.1% locust bean gum, and 18.0% high methoxyl pectin in sufficient aqueous medium to form a 6.21% (w/w) aqueous dispersion, and;
(b) combining about 32.2 parts 60 Brix fruit juice concentrate by weight with about 100 parts aqueous glycoprotein to form a stable, protein-fortified juice beverage.

21. A method in accordance with claim 20, further comprising homogenizing the stable, protein-fortified juice beverage.

22. A method in accordance with claim 21 further comprising sterilizing the stable, protein-fortified juice beverage.

23. A stable, protein-fortified juice beverage produced in accordance with the method of claim 20.

* * * * *